United States Patent [19]
Maeno

[11] Patent Number: 5,887,201
[45] Date of Patent: Mar. 23, 1999

[54] CAMERA DRIVING STOP APPARATUS

[75] Inventor: Hitoshi Maeno, Hachioji, Japan

[73] Assignee: Olympus Optical Co., Ltd., Tokyo, Japan

[21] Appl. No.: 886,619

[22] Filed: Jul. 1, 1997

[30] Foreign Application Priority Data

Jul. 19, 1996 [JP] Japan .................................. 8-190232

[51] Int. Cl.$^6$ .................................................. G03B 17/00
[52] U.S. Cl. ................................. 396/86; 396/85; 396/87; 396/135; 396/136
[58] Field of Search ........................... 396/86, 135, 136, 396/85, 87

[56] References Cited

U.S. PATENT DOCUMENTS

| 4,568,165 | 2/1986 | Ishibashi | 396/136 |
|---|---|---|---|
| 4,772,909 | 9/1988 | Ogasawara | 396/136 |
| 4,777,504 | 10/1988 | Akada et al. | |
| 4,878,077 | 10/1989 | Maeno et al. | 396/135 |

FOREIGN PATENT DOCUMENTS 7-49455  11/1995  Japan .

*Primary Examiner*—Russell Adams
*Attorney, Agent, or Firm*—Frishauf, Holtz, Goodman, Langer & Chick

[57] ABSTRACT

In a camera driving stop apparatus, a motor serves as a driving source upon reception of a current. A driven unit performs a predetermined operation associated with driving of a camera by using the motor as the driving source. A pulse generator outputs a pulse in response to the operation of at least one of the motor and the driven unit. A position detector detects the current position of the driven unit by counting pulses output from the pulse generator. When the width of the pulse output from the pulse generator is equal to or larger than a first time, an energization unit energizes the motor for only a second time shorter than the first time. An energization stop unit stops energization of the motor for only a third time shorter than the first time. A forcible energization stop unit inhibits energization of the motor. A storage unit holds the target position of the driven unit. A controller compares the target position of the driven unit held in the storage unit with the current position detected by the position detector, alternately operates the energization unit and the energization stop unit when the target position and current position do not coincide with each other, and operates the forcible energization stop unit when target position and current position coincide with each other.

32 Claims, 9 Drawing Sheets

CAMERA DRIVING STOP APPARATUS

BACKGROUND OF THE INVENTION

The present invention relates to a camera which automatically operates by controlling an electric motor and, more particularly, to a camera driving stop apparatus which performs precision control to stop, at a desired target position, a driving mechanism for performing zooming and focusing of a photographing lens, film feed, switching of the driving force transmission path, and the like.

In conventional camera zooming or focusing driving control, when a driven unit comes close to a target position, its driving speed is reduced in order to stop it at the target position as accurately as possible, as described in Jpn. UM Appln. KOKOKU Publication No. 7-49455 (U.S. Pat. No. 4,777,504).

In the above control, if the electric motor comes to stop immediately before the driven unit reaches the target position, the electric motor is restarted so as to allow the driven unit to reach the target position.

In this prior art, the driving speed is simply reduced until the driven unit reaches the predetermined target position, or the electric motor is restarted. For this reason, the driven unit is influenced by the ambient temperature, the posture of a driving system, aging deterioration, the mechanical time constant of the driving system, and the like, resulting in variations in the final stop position of the driven unit.

The reason why the stop position of the driven unit varies will be described with reference to FIGS. 12A and 12B.

FIGS. 12A and 12B are timing charts, respectively, showing the waveform of the output pulse from a pulse generation means which is attached to the driven unit such as a focusing mechanism for a photographing lens, and operates in response to movement of this driven unit, and the ON/OFF state of the motor which drives the driven unit at this time.

FIG. 12A shows that the driven means properly overruns and stops at a target position (n+N) upon turning off the ON motor when the count value, 1, . . . , n−1, n, n+1, . . . , n+(N−1), n+N, of output pulses from the pulse generation means reaches a predetermined pulse count (n) before the target position.

That is, the stop position coincides with the target position in this case.

If the moving speed of the driving system is known, the overrunning pulse amount (N) can be predicted, so that control in this form is possible.

In fact, however, the driven unit may stop before the target position due to changes in ambient temperature, posture differences of the driving system, aging deterioration, or the like, resulting in variations the final stop position.

For this reason, as shown in FIG. 12B, if the count value does not reach the predetermined pulse count (n+N) a predetermined time a after the pulse edge at a point n+(N−1) upon turning off the motor at the predetermined pulse count (n), control is performed to restart the motor in order to drive the driven means to the target position, and to stop the motor after it is detected that the driven unit has indeed reached the target position (n+N).

Under this control, however, the response is delayed owing to the mechanical time constant of the driving system, and the driven unit undesirably stops at a position n+(N+x) past the target position.

That is, even if the motor is energized immediately before the target position, and turned off when the driven unit reaches the target position, since excess energy has been supplied to the driving mechanism including the motor due to the mechanical time constant of the driving system before the driven unit reaches the target position, the driven unit overruns by a distance corresponding to the excess energy, and stops.

BRIEF SUMMARY OF THE INVENTION

The present invention has been made in consideration of the above-described conventional drawback that the stop position of a driven unit varies due to the influences of the ambient temperature and the like, and has as its object to provide a camera driving stop apparatus capable of reliably stopping the driven unit at an accurate target position in various operation states.

According to a first aspect of the present invention, there is provided a camera stop driving apparatus comprising: a motor serving as a driving source upon reception of a current; a driven unit for performing a predetermined operation associated with driving of a camera by using said motor as said driving source; a pulse generator for outputting a pulse in response to an operation of at least one of said motor and said driven unit; a position detector for detecting a current position of said driven unit by counting pulses output from said pulse generator; an energization unit for energizing said motor for only a second time shorter than a first time; an energization stop unit for stopping energization of said motor for only a third time shorter than the first time; a forcible energization stop unit for inhibiting energization of said motor; a storage unit for holding a target position of said driven unit; and a controller for: (i) comparing the target position of said driven unit held in said storage unit with the current position detected by said position detector when a width of the pulse output from said pulse generator is not less than the first time, (ii) alternately operating said energization unit and said energization stop unit when the target position and current position do not coincide with each other, and (iii) operating said forcible energization stop unit when the target position and current position coincide with each other.

According to a second aspect of the present invention, there is provided a camera driving stop apparatus comprising: a motor serving as a driving source upon reception of a current; a driven unit for performing a predetermined operation associated with an operation of a camera by using said motor as said driving source; a pulse generator for outputting a pulse in response to an operation of at least one of said motor and said driven unit; a position detector for detecting a current position of said driven unit by counting pulses output from said pulse generator; a storage unit for holding a target position of said driven unit; and a controller for: (i) comparing the target position of said driven unit held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

According to a third aspect of the present invention, said controller according to the second aspect of the present invention: (i) compares the target position of said driven unit held in said storage unit with the current position detected by said position detector when the target position and current position do not coincide with each other, (ii) alternately energizes and stops energization of said motor while increasing the first time each time said motor is energized, and (iii) when the target position and current position coincide with each other, inhibits energization of said motor.

According to a fourth aspect of the present invention, there is provided a camera driving stop apparatus comprising: a motor serving as a driving source upon reception of a current; a photographing lens zooming mechanism for performing a zooming operation for a photographing lens of a camera by using said motor as said driving source; a pulse generator for outputting a pulse in response to an operation of at least one of said photographing lens zooming mechanism and said motor; a position detector for detecting a current position of said photographing lens zooming mechanism by counting pulses output from said pulse generator; a storage unit for holding a target position of said photographing lens zooming mechanism; and a controller for: (i) comparing the target position of said photographing lens zooming mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

According to a fifth aspect of the present invention, there is provided a camera driving stop apparatus comprising: a motor serving as a driving source upon reception of a current; a photographing lens focusing mechanism for performing a focusing operation for a photographing lens of a camera by using said motor as said driving source; a pulse generator for outputting a pulse in response to an operation of at least one of said photographing lens focusing mechanism and said motor; a position detector for detecting a current position of said photographing lens focusing mechanism by counting pulses output from said pulse generator; a storage unit for holding a target position of said photographing lens focusing mechanism; and a controller for: (i) comparing the target position of said photographing lens focusing mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

According to a sixth aspect of the present invention, there is provided a camera driving stop apparatus comprising: a motor serving as a driving source upon reception of a current; a film feed mechanism for performing a film feed operation for a camera by using said motor as said driving source; a pulse generator for outputting a pulse in response to an operation of at least one of said film feed mechanism and said motor; a position detector for detecting a current position of the film feed mechanism by counting pulses output from said pulse generator; a storage unit for holding a target position of said film feed mechanism; and a controller for: (i) comparing the target position of said film feed mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

According to a seventh aspect of the present invention, there is provided a camera driving stop apparatus comprising: a motor serving as a driving source upon reception of a current; a driving force transmission path switching mechanism for switching a driving force transmission path of a camera by using said motor as said driving source; a pulse generator for outputting a pulse in response to an operation of at least one of said driving force transmission path switching mechanism and said motor; a position detector for detecting a current position of said driving force transmission path switching mechanism by counting pulses output from said pulse generator; a storage unit for holding a target position of said driving force transmission path switching mechanism; and a controller for: (i) comparing the target position of said driving force transmission path switching mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

Additional objects and advantages of the invention will be set forth in the description which follows, and in part will be obvious from the description, or may be learned by practice of the invention. The objects and advantages of the invention may be realized and obtained by means of the instrumentalities and combinations of particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below serve to explain the principles of the invention.

DETAILED DESCRIPTION OF THE INVENTION

Figure 1:
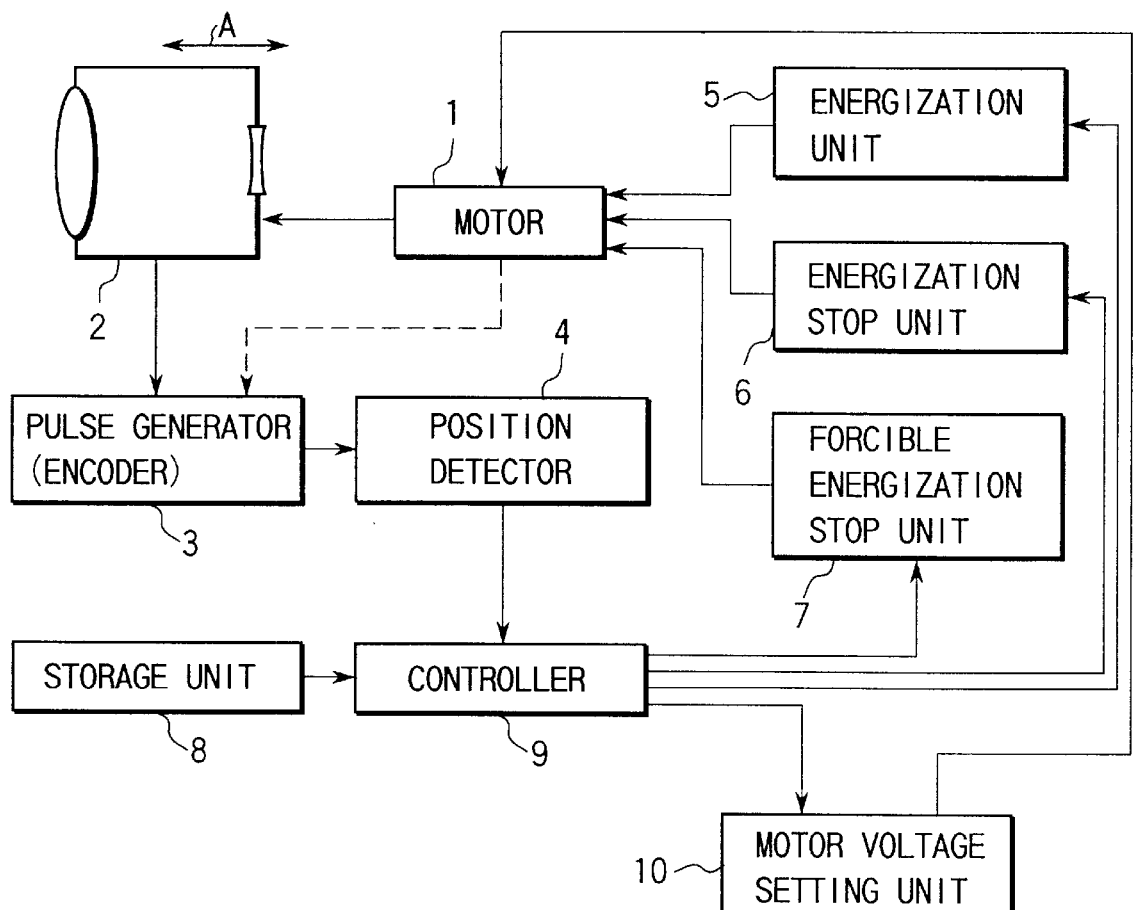
FIG. 1 is a block diagram showing the schematic arrangement of a camera driving stop apparatus according to the first embodiment of the present invention.

Reference will now be made in detail to the presently preferred embodiments of the invention as illustrated in the accompanying drawings, in which like reference characters designate like or corresponding parts throughout the several drawings.

(First Embodiment)

The first embodiment of the present invention will be described below with reference to FIGS. 1 to 6.

FIG. 1 is a block diagram showing the arrangement of a camera driving stop apparatus according to this embodiment.

FIGS. 2 to 6 are timing charts, respectively, showing the waveform of the output pulse from a pulse generator serving as an encoder which operates in response to the operation of at least one of a driven unit and a motor, and the ON/OFF state of the motor which drives the driven unit at this time.

As shown in FIG. 1, the camera driving stop apparatus of this embodiment is mainly constituted by a motor 1 which serves as a driving source upon reception of a current, a driven unit 2 driven by the motor 1 to perform a predetermined operation, a pulse generator 3 serving as an encoder for generating a pulse in response to the operation of at least one of the driven unit 2 and the motor 1, a position detector 4 for detecting the current position of the driven unit 2 by counting the pulses from the pulse generator 3, an energization unit 5 for energizing the motor 1 for only a second time shorter than a first time when the width of the pulse output from the pulse generator 3 is equal to or larger than the first time, an energization stop unit 6 for stopping energization to the motor 1 for only a third time shorter than the first time, a forcible energization stop unit 7 for forcibly stopping energization to the motor 1, a storage unit 8 holding the target position of the driven unit 2 in advance, and a controller 9 for comparing the target position of the driven unit 2 held in the storage unit 8 with the current position detected by the position detector 4, and alternately operating the energization unit 5 and the energization stop unit 6 when the two positions do not coincide with each other, or operating the forcible energization stop unit 7 when they coincide with each other.

In this specification, the pulse width means the time interval between detection of the trailing edge of a pulse signal and detection of the leading edge of the next pulse signal, or the time interval between detection of the leading edge of a pulse signal and detection of the trailing edge of the next pulse signal.

Although the driven unit 2 is a photographing lens in FIG. 1, it is not particularly limited in the camera driving stop apparatus according to this embodiment, and is only a driving system in a camera, that is to be driven by the motor 1.

If voltage switching is necessary to drive the motor 1, a motor voltage setting means 10 is further arranged.

The controller 9 may make the first time of the energization unit 5 effective only when the driven unit 2 comes close to the target position, and may control the energization unit 5 independently of the first time till then.

The controller 9 may make the second time of the energization stop unit 6 effective only when the driven unit 2 comes close to the target position, and may control the energization stop unit 6 independently of the second time till then.

The operation of the camera driving stop apparatus having the above arrangement will be described below.

When the driven unit 2 is driven by the motor 1 in a direction indicated by an arrow A in FIG. 1 on the basis of target position information held in the storage unit 8, if the current position of the driven unit 2 detected by the position detector 4 becomes close to the target position, the controller 9 controls the driven unit 2 to reduce its moving speed.

More specifically, the controller 9 alternately operates the energization unit 5 and the energization stop unit 6 to drive the driven unit 2 at a low speed.

Even if the driven unit 2 stops before reaching the target position due to the influences of the ambient temperature, posture differences of the driving system, aging deterioration, and the like, the controller 9 tries to restart the driven unit 2 by alternately operating the energization unit 5 and the energization stop unit 6.

At this time, the controller 9 drives the driven unit 2 to the target position by switching the energization time of the energization unit 5, the energization stop time of the energization stop unit 6, and the motor voltage by the motor voltage setting unit 10, as needed.

When the driven unit 2 reaches the target position, the controller 9 immediately operates the forcible energization stop unit 7 to stop the movement of the driven unit 2.

The operation of the camera driving stop apparatus will be described in detail below with reference to the timing charts in FIGS. 2 to 6.

Figure 12A:
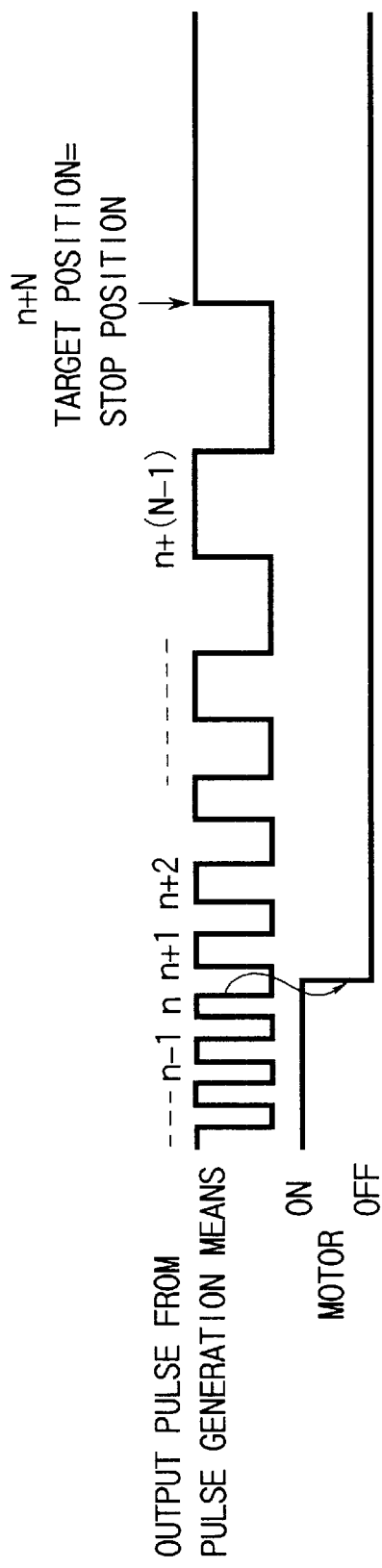
FIGS. 12A and 12B are timing charts, respectively, for explaining a prior art.
Figure 12B:
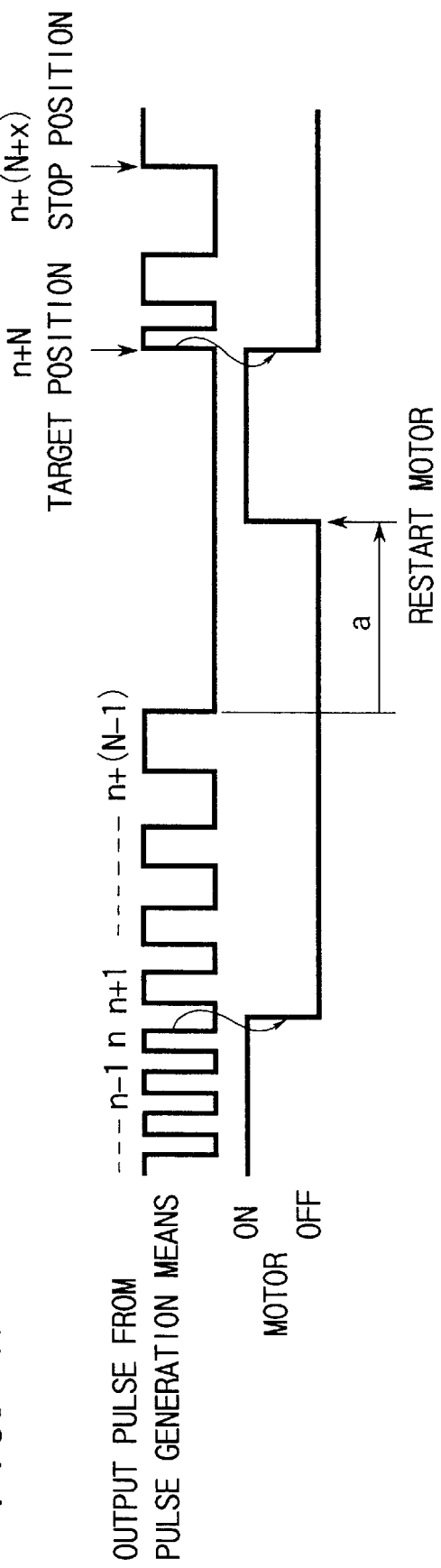

FIGS. 2 to 6 show timing charts in a case wherein the motor 1 is controlled in a predetermined form in order to restart the driven unit 2 toward the target position when the driven unit 2 undesirably stops 0.5 pulse before the target position upon stopping the motor 1 in the above-described manner under the driving stop control of the driven unit 2, i.e., the driven unit 2 stops after a change (pulse edge) in output pulse from the pulse generator 3 (to be referred to as an encoder hereinafter) at a point X (corresponding to n+(N−1) in FIG. 12B) in FIGS. 2 to 6.

The first control form of the present invention will be described with reference to FIG. 2.

Figure 2:
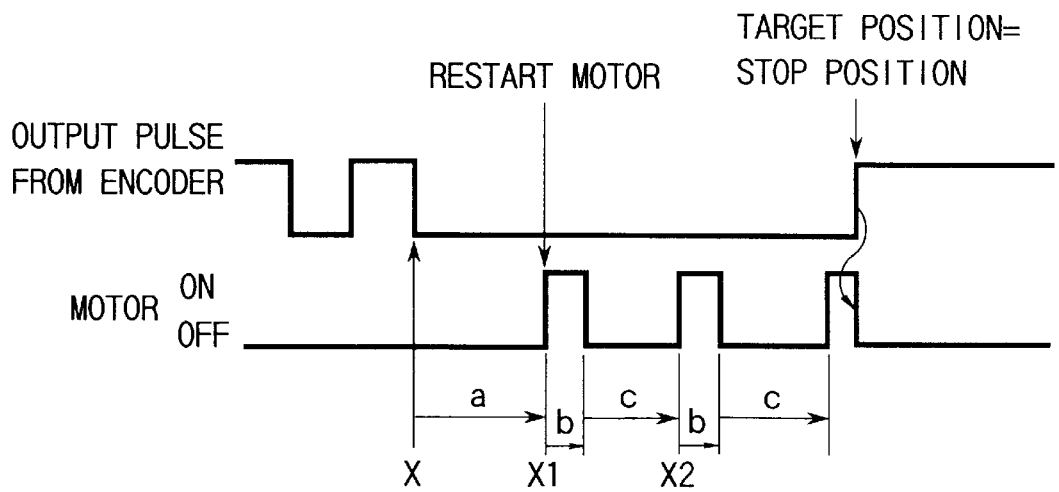
FIG. 2 is a timing chart for explaining the operation in the first embodiment.

If the position detector 4 does not detect any change (pulse edge) in output signal from the encoder 3 representing arrival at the target position, even at a point X1 a time a after detecting a change in output signal from the encoder 3 at the point X in FIG. 2, the controller 9 determines that the driven unit 2 has stopped, and operates the energization unit 5 to restart the motor 1.

The energization unit 5 is set to energize the motor 1 for only a time b as the second time shorter than the first time in restarting driving of the motor 1 when the width of the output pulse from the encoder 3 is equal to or larger than the first time.

After the time b, the controller 9 operates the energization stop unit 6 to stop energization to the motor 1.

The energization stop unit 6 is set to stop energization to the motor 1 for only a time c as the third time shorter than the first time in stopping the motor 1 again.

The time b is a time in which an energy sufficient enough to start the whole driving system can be supplied at a voltage normally applied to the motor 1.

The time c a wait time before the whole driving system starts and the driven unit 2 actually moves upon supplying an energy.

In FIG. 2, since no change in output pulse from the encoder 3 representing arrival at the target position is detected even at a point X2 after the initial time c, the controller 9 operates the energization unit 5 to energize the motor 1 again in the above-described manner.

After the time b, the controller 9 operates the energization stop unit 6 to stop energization to the motor 1 in the above-described manner.

The controller 9 further operates the energization unit 5 to energize the motor 1.

Since the position detector 4 detects a change (pulse edge) in output pulse from the encoder 3 representing arrival at the target position before the lapse of the time b, the controller 9 operates the forcible energization stop unit 7 to immediately stop energization to the motor 1.

In the conventional control method described with reference to FIG. 12B, the driven unit may overrun the target position upon stopping re-energization to the motor 1.

In the first control form of the present invention, the motor 1 is energized for only the second time shorter than the first time in restarting driving of the motor 1 when the width of the output pulse from the encoder 3 is equal to or larger than the first time. Therefore, no excess energy is supplied to the driving system, and the driven unit 2 hardly overruns the target object.

The second control form of the present invention will be described below with reference to FIG. 3.

This control scheme is basically the same as the scheme described with reference to FIG. 2 except that the energization time b for the set motor 1 is controlled to become sequentially longer, i.e., b1<b2<b3, each time the energization unit 5 is operated.

With this control form, starting can be reliably executed even if the load of the driving system increases due to the ambient temperature, posture differences of the driving system, aging deterioration, or the like to disable starting with the fixed energization time b, as in the above-described first control form.

Figure 3:
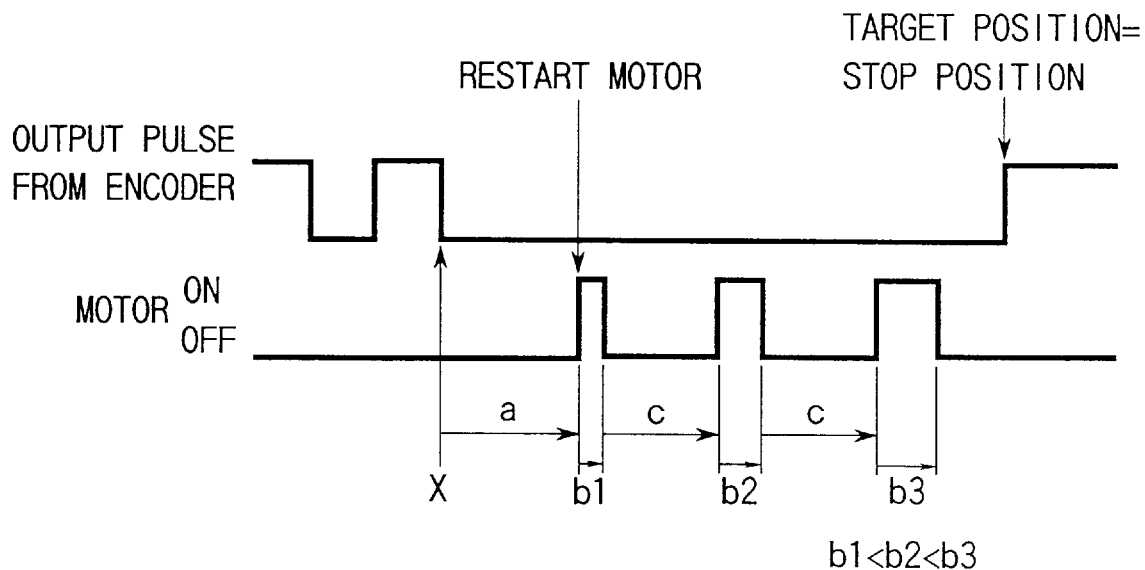
FIG. 3 is a timing chart for explaining the operation in a modification of the first embodiment.

In FIG. 3, since the position detector 4 detects a change (pulse edge) in output pulse from the encoder 3 representing arrival at the target position before the lapse of the time c during operation of the energization stop unit 6, the controller 9 operates the forcible energization stop unit 7 to stop energization to the motor 1, as in the scheme described with reference to FIG. 2.

In this example, the forcible energization stop unit 7 need not always be operated because energization to the motor 1 is stopped when the driven unit 2 reaches the target position.

The third control form of the present invention will be described below with reference to FIG. 4.

This control scheme is basically the same as the scheme described with reference to FIG. 2 except that the energization stop time c for the set motor 1 is controlled to become sequentially shorter, i.e., c1>c2, each time the energization stop unit 6 is operated.

With this control form, starting can be reliably executed even if the load of the driving system increases due to the ambient temperature, posture differences of the driving system, aging deterioration, or the like to disable starting with the fixed energization stop time c, unlike as in the above-described first control form.

The fourth control form of the present invention will be described below with reference to FIG. 5.

This control scheme is basically the same as the scheme described with reference to FIG. 2 except that the energization time b for the set motor 1 is controlled to become sequentially longer, like b1<b2<b3, each time the energization unit 5 is operated.

In this case, the energization scheme of the energization unit 5 is not DC energization but pulse-like energization.

The energization time b is prolonged in units of time steps corresponding to an integral number of energization pulses.

Figure 5:
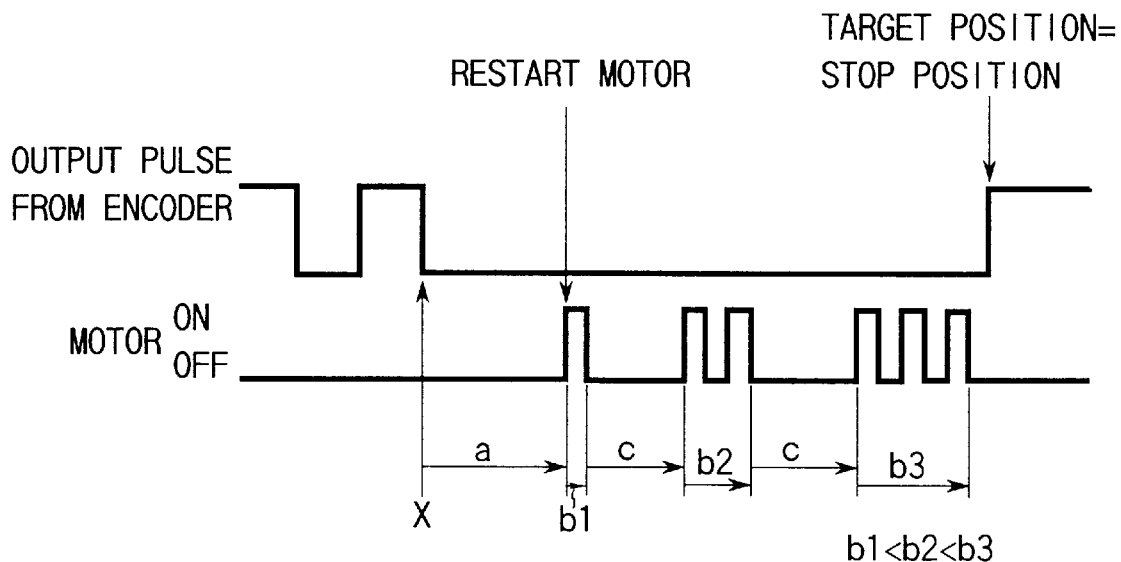
FIG. 5 is a timing chart for explaining the operation in a modification of the first embodiment.

In FIG. 5, the energization time is prolonged in units of 1-pulse steps to attain the energization time b1 corresponding to one pulse the first time, the energization time b2 corresponding to two pulses the second time, and the energization time b3 corresponding to three pulses the third time.

Also with this control scheme in FIG. 5, the same effect as in the control scheme described with reference to FIG. 3 can be obtained.

The fifth control form of the present invention will be described below with reference to FIG. 6.

In FIG. 3, the energization time b for the set motor 1 is controlled to become sequentially longer, i.e., b1<b2<b3, each time the energization unit 5 is operated.

To the contrary, in this control form, control is performed to switch the driving voltage of the motor 1 by the motor voltage setting unit 10 so as to gradually increase the driving voltage to V1, V2, and V3 while keeping the energization time b constant.

Each time the energization unit 5 is operated, the controller 9 sequentially sends control signals for setting the voltages V1, V2, and V3 to the motor voltage setting means 10 to switch the driving voltage of the motor 1.

Also with this control scheme in FIG. 6, the same effect as in the control scheme described with reference to FIG. 3 can be obtained.

In the present invention, as another control form, the third control form and the second, fourth, or fifth control form may be combined to change both the energization time and the energization stop time, as a matter of course.

The second to fifth embodiments of the present invention will be described below with reference to FIGS. 7 to 10.

Although the driven unit 2 is not specifically limited in the camera driving stop apparatus of the first embodiment and the seventh embodiment (to be described later), this driven unit 2 will be specified below, and the second to fifth embodiments will be described.

Figure 13:
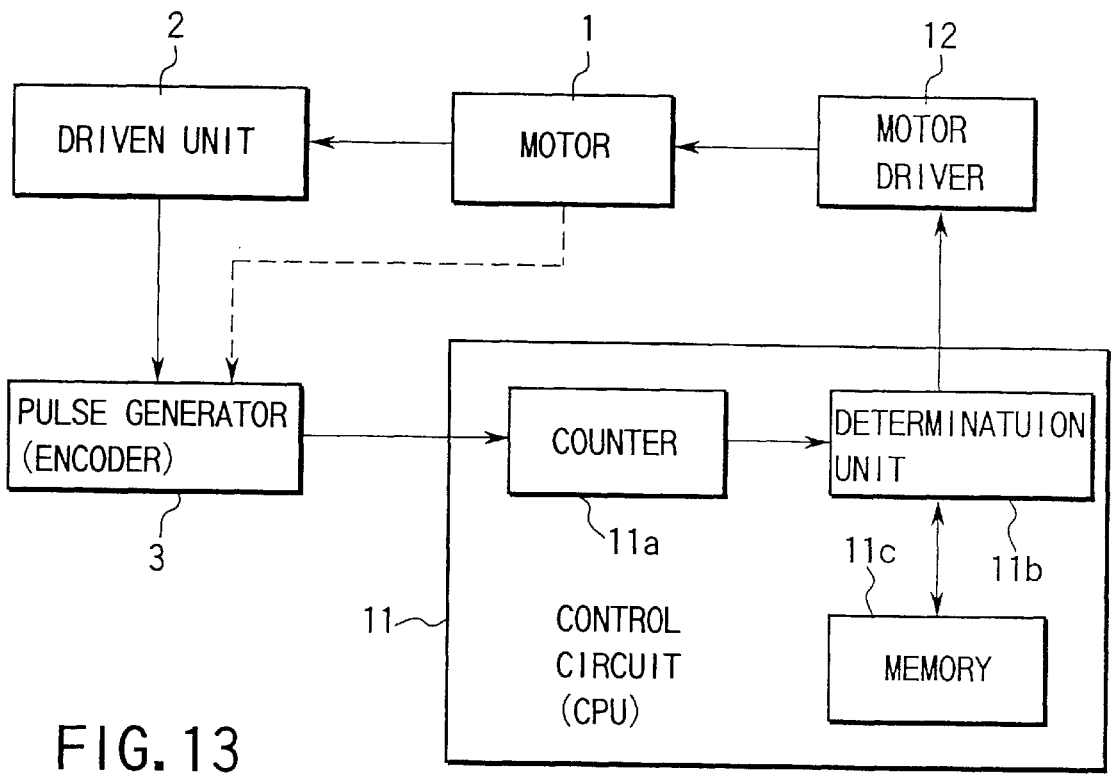
FIG. 13 is a block diagram showing the schematic arrangement of a camera driving stop apparatus according to the seventh embodiment of the present invention.

The arrangement of the first embodiment shown in FIG. 1 or that of the seventh embodiment (to be described later) shown in FIG. 13 is directly applied to the camera driving stop apparatus in the second to fifth embodiments, and the controller 9 performs one of the plurality of control forms including the above-described second to fifth control forms.

(Second Embodiment)

In the camera driving stop apparatus of this embodiment, the driven unit 2 is a photographing lens focusing mechanism.

Figure 7:
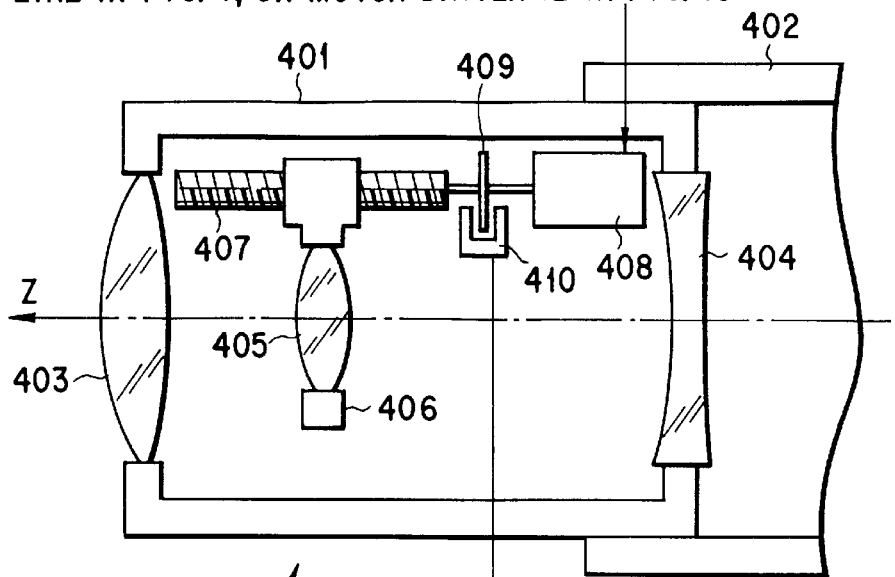
FIG. 7 is a sectional view showing a photographing lens focusing mechanism as a main constituent component according to the second embodiment of the present invention.

FIG. 7 is a sectional view showing the photographing lens focusing mechanism.

A lens barrel 401 is connected to a camera main body (not shown) through an interlocking frame 402, and holds first and third lens groups 403 and 404.

A second-lens-group frame 406 movable back and fourth within the lens barrel 401 in a lens optical axis direction indicated by an arrow in FIG. 7 is arranged inside the lens barrel 401.

The second-lens-group frame 406 holds a second lens group 405.

A motor 408 rotates a feed screw 407 to move the second-lens-group frame 406 having a screw hole formed therein so as to interlock with the feed screw 407.

The rotation speed and amount of the feed screw 407, i.e., the moving speed and amount of the second-lens-group frame 406 can be detected by reading slits formed in a disk 409 serving as an encoder coupled to the motor 408 using a photointerrupter 410.

The second lens group 405 is the focusing lens of this optical system.

The operation of the motor 408 is feedback-controlled using a pulse signal output from the photointerrupter 410 to control focusing.

The motor 408 corresponds to the motor 1 in FIG. 1 or FIG. 13 (to be described later), and the disk 409 serving as the encoder and the photointerrupter 410 correspond to the encoder 3.

With the above arrangement, the photographing lens can be accurately stopped at in-focus position by any one of the plurality of control forms described with reference to the above-mentioned first embodiment.

(Third Embodiment)

In the camera driving stop apparatus of this embodiment, the driven unit 2 is a photographing lens zooming mechanism.

Figure 8:
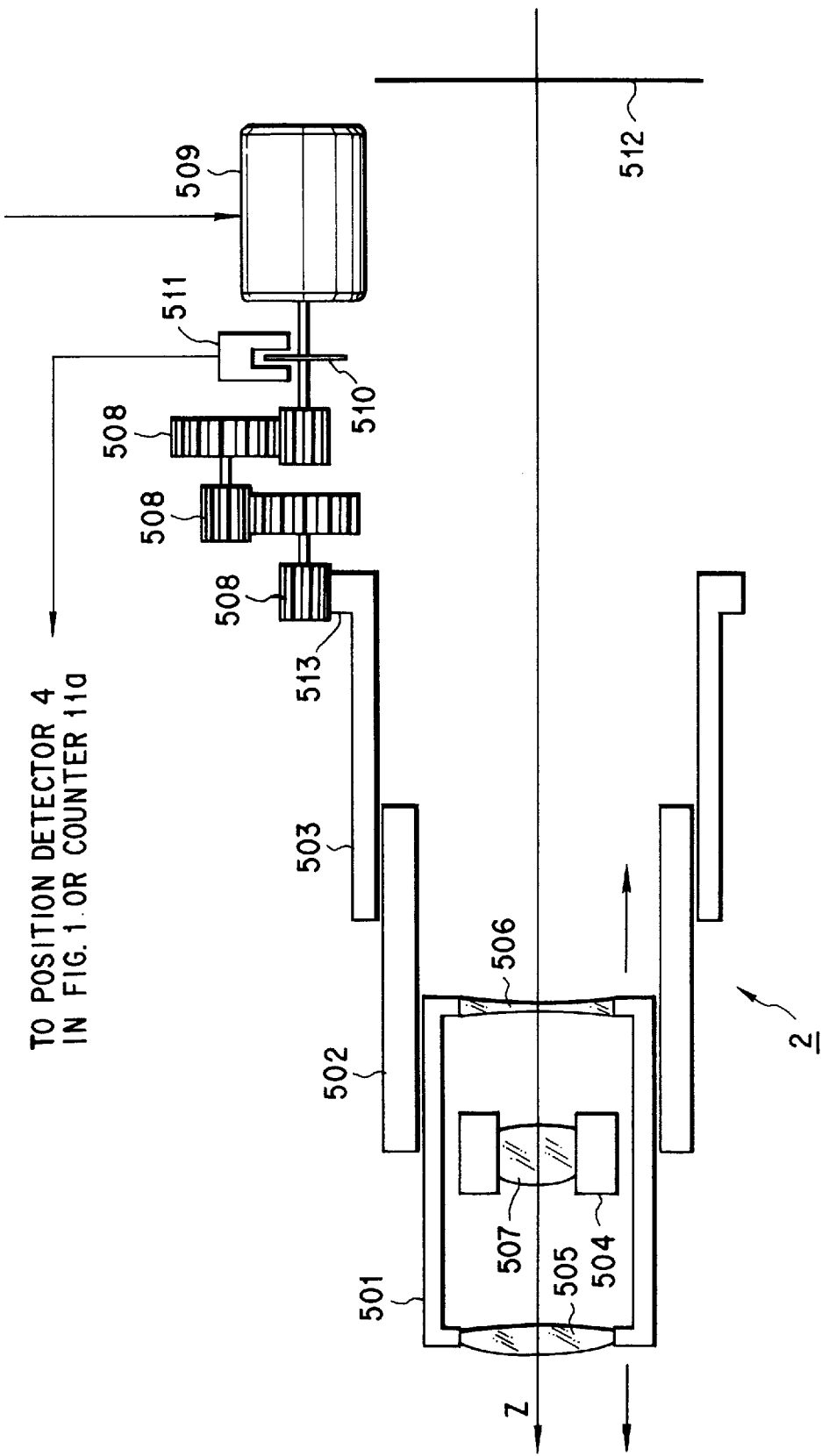
FIG. 8 is a sectional view showing a photographing lens zooming mechanism as a main constituent component according to the third embodiment of the present invention.

FIG. 8 is a sectional view showing the photographing lens zooming mechanism.

A lens barrel 501 is connected to a camera main body (not shown) through interlocking frames 502 and 503, and holds first and third lens groups 505 and 506.

A second-lens-group frame 504 movable within the lens barrel 501 in a lens optical axis direction indicated by an arrow Z in FIG. 8 is arranged inside the lens barrel 501. The second-lens-group frame 504 holds a second lens group 507.

A motor 509 rotates a reduction gear train 508 to rotate the interlocking frame 503 having a gear 513 formed on its outer circumferential surface so as to interlock with the reduction gear train 508.

The lens barrel 501 is constituted to move back and fourth in the lens optical axis direction upon rotating the interlocking frame 503.

The second-lens-group frame 504 also moves in an optical axis direction (indicated by arrows in FIG. 8) inside the lens barrel 501, interlocked with the movement of the lens barrel 501 in the optical axis direction.

The rotation speed and amount of the motor 509, i.e., the moving speed and amount of the lens barrel 501 can be detected by reading slits formed in a disk 510 serving as an encoder coupled to the motor 509 using a photointerrupter 511.

The distance between the lens principal point of this optical system determined by the relative positions of the first, third, and second lens groups 505, 506, and 507 incorporated in the lens barrel 501, and a film surface 512 is the focal length of the whole optical system.

The operation of the motor 509 is feedback-controlled using a pulse signal output from the photointerrupter 511 to control the focal length, i.e., the zooming mechanism.

The motor 509 corresponds to the motor 1 in FIG. 1 or FIG. 13 (to be described later), and the disk 510 serving as the encoder and the photointerrupter 511 correspond to the encoder 3.

With the above arrangement, the photographing lens can be accurately stopped at an arbitrary focal length position by any one of the plurality of control forms described in the above-mentioned first embodiment.

(Fourth Embodiment)

In the camera driving stop apparatus of this embodiment, the driven unit 2 is a film feed mechanism.

Figure 9:
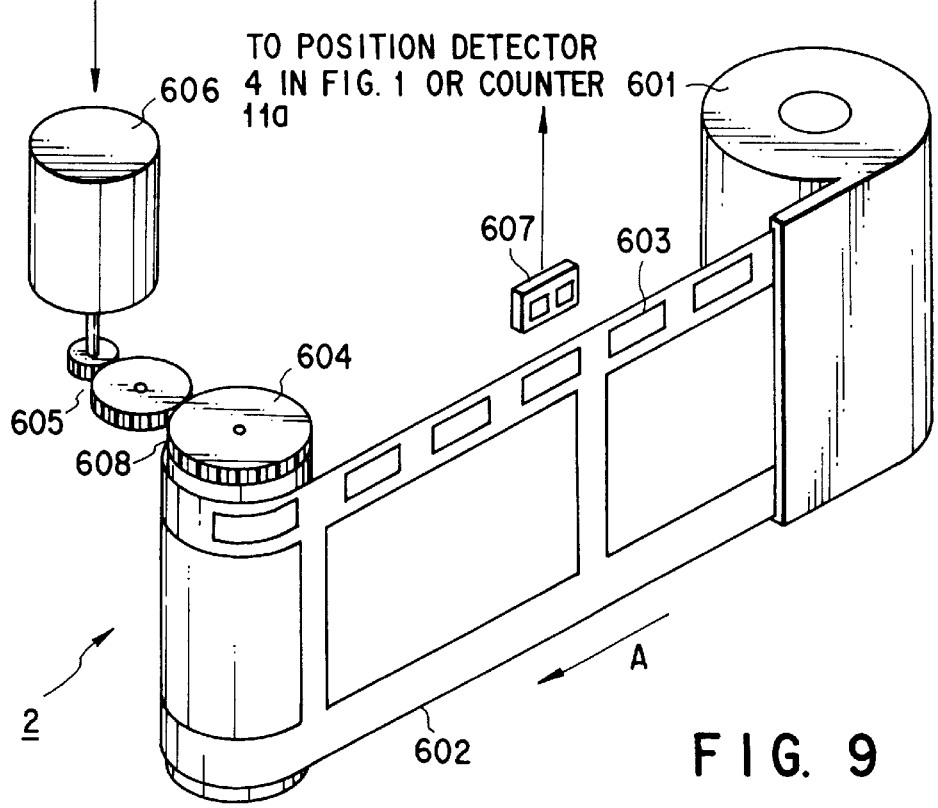
FIG. 9 is a perspective view showing a film feed mechanism as a main mechanism according to the fourth embodiment of the present invention.

FIG. 9 is a perspective view showing the main part of the film feed mechanism.

A film 602 is pulled out from a Patrone 601 and wound around a spool 604.

A motor 606 rotates a reduction gear 605 to rotate the spool 604 having a gear 608 formed on its outer circumferential surface so as to interlock with the reduction gear 605.

The spool 604 rotates to take up the film 602 therearound in a direction indicated by an arrow A in FIG. 9, thereby winding up the film 602.

The moving speed and amount of the film 602 can be detected by reading perforations 603 continuously formed at the upper end of the film 602 using a photo-reflector 607.

The moving amount corresponding to a predetermined number of perforations 603 is a one-frame wind-up amount.

The operation of the motor 606 is feedback-controlled using a pulse signal output from the photoreflector 607 to perform one-frame wind-up control.

The motor 606 corresponds to the motor 1 in FIG. 1 or FIG. 13 (to be described later), and the photo-reflector 607 corresponds to the pulse generator 3.

With the above arrangement, the film can be accurately stopped at the next frame position by any one of the plurality of control forms described in the above-mentioned first embodiment.

(Fifth Embodiment)

In the camera driving stop apparatus of this embodiment, the driven unit 2 is a driving force transmission switching mechanism capable of switching the driving force between film feed and zoom driving.

Figure 10:
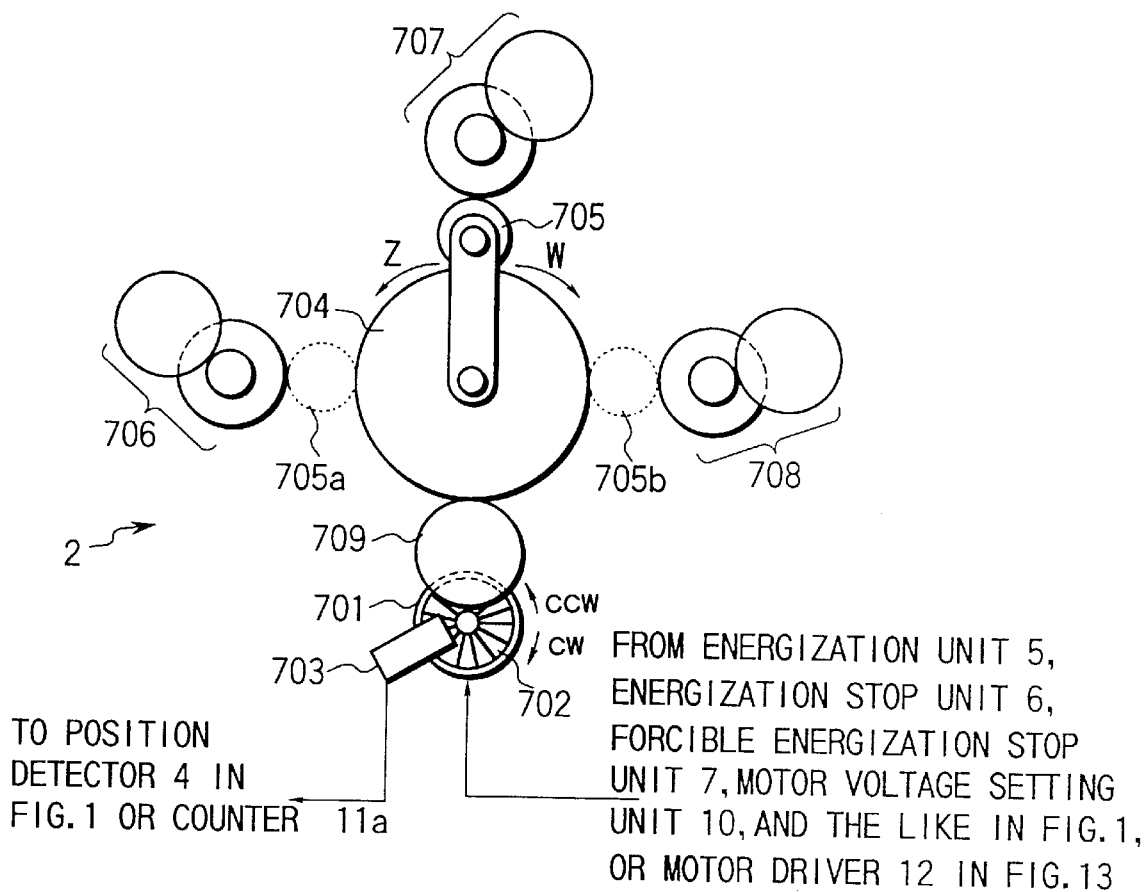
FIG. 10 is a plan view showing a driving force transmission switching mechanism as a main constituent component according to the fifth embodiment of the present invention.

FIG. 10 is a plan view showing the driving force transmission switching mechanism.

A planet gear 705 freely revolves around a sun gear 704.

When a motor 701 rotates in a direction cw in FIG. 10, the planet gear 705 pivots in a direction W in FIG. 10 through a gear train 709.

When the motor 701 rotates in a direction ccw in FIG. 10, the planet gear 705 pivots in a direction Z in FIG. 10.

The planet gear 705 stops at three positions 705, 705a, and 705b, is coupled to gear trains 706, 707, and 708 arranged at the respective positions, and transmits the power of the motor 701 to cause the camera to perform predetermined operations.

For example, when the planet gear 705 stops at the position 705, it is connected to the gear train 707 to focus the photographing lens; when it stops at the position 705a, it is connected to the gear train 706 to zoom the photographing lens; and when it stops at the position 705b, it is connected to the gear train 708 to wind up the film.

In fact, the planet gear 705 must be locked after stopping at any one of the three positions, a description of which will be omitted in this embodiment.

The rotation speed and amount of the motor 701, i.e., the moving speed and position of the planet gear 705 can be detected by reading slits formed in a disk 702 serving as an encoder coupled to the motor 701 using a photointerrupter 703.

The operation of the motor 701 is feedback-controlled using a pulse signal output from the photointerrupter 703 to control the position of the planet gear.

The motor 701 corresponds to the motor 1 in FIG. 1 or FIG. 13 (to be described later), and the disk 702 serving as the encoder and the photointerrupter 703 correspond to the pulse generator 3.

With the above arrangement, the planet gear can be accurately stopped at the focusing driving force transmission position, the film feed driving force transmission position, or the zoom driving force transmission position by any one of the plurality of control forms described in the above-mentioned first embodiment.

(Sixth Embodiment)

The above-described embodiments exemplify the case wherein the driven unit 2 stops immediately before reaching the target position, and the motor 1 shown in FIG. 1 or FIG. 13 (to be described later) is controlled to be restarted.

However, the present invention can also be applied to a camera driving stop apparatus in which the driven unit 2 can be accurately stopped at the target position without stopping it before reaching the target position, instead of restarting the motor 1 after the driven unit 2 stops.

Such a camera driving stop apparatus will be described below as the sixth embodiment with reference to FIG. 11.

Since the arrangement itself of the camera driving stop apparatus according to this embodiment is the same as that of the camera driving stop apparatus shown in the first embodiment or the seventh embodiment (to be described later), the same reference numerals denote the same parts, and an illustration thereof will be omitted.

A driven unit 2 in this embodiment suffices to be one that performs a predetermined operation with the motor, similar to the various mechanisms described in the second to fifth embodiments, and is not particularly limited.

Figure 11:
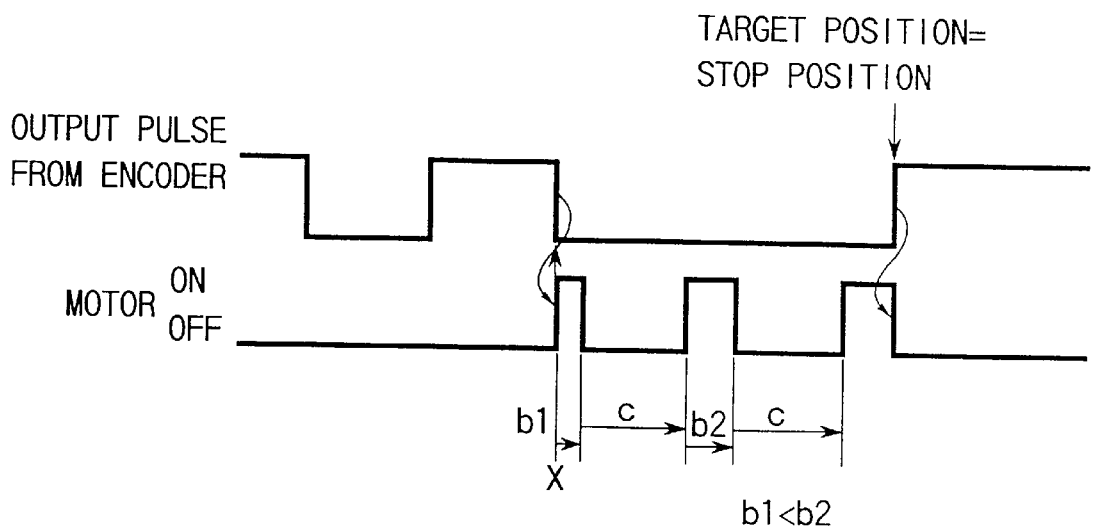
FIG. 11 is a timing chart for explaining the operation of the sixth embodiment according to the present invention.

FIG. 11 is a timing chart showing the waveform of an output pulse from an encoder 3 which operates in response to movement of the driven unit 2, and the ON/OFF state of a motor 1 which drives the driven unit 2 at this time.

As described above, a point X in FIG. 11 is a position 0.5 pulse before the target position after stopping the motor 1.

When the output pulse from the encoder 3 changes, which is indicated by the point X, the moving speed of the driven unit 2 is detected on the basis of the width of the output pulse from the encoder 3, and compared with a reference moving speed stored in a storage unit 8 in addition to the target position.

At this time, if it is determined that the moving speed of the driven unit 2 is lower than the reference moving speed, and the driven unit 2 will stop before reaching the target position unless the motor 1 is turned on, the motor 1 is immediately turned on for only the above-described predetermined time b, and turned off for only the above-mentioned predetermined time c.

The energization time b for the motor 1 and the energization stop time c for the motor 1 are the same as those described with reference to FIG. 3, and a description thereof will be omitted.

Figure 4:
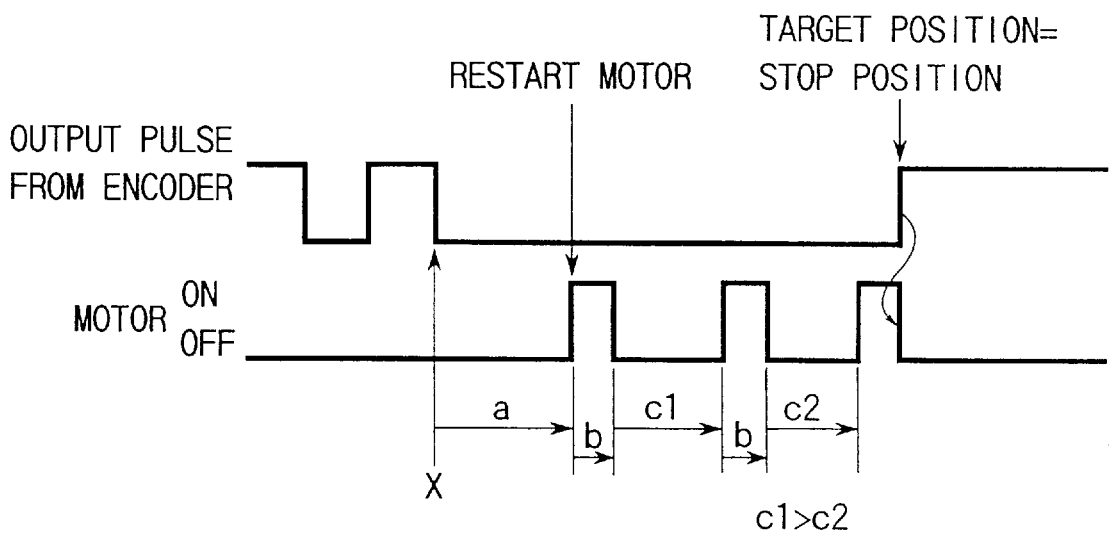
FIG. 4 is a timing chart for explaining the operation in a modification of the first embodiment.
Figure 6:
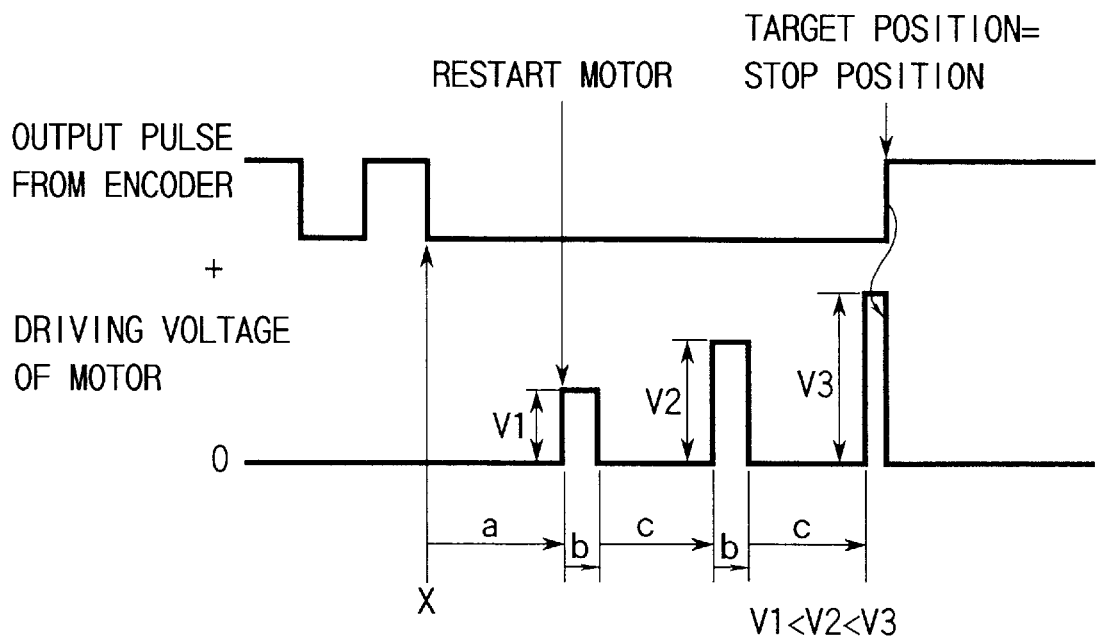
FIG. 6 is a timing chart for explaining the operation in a modification of the first embodiment.

As a modification of the sixth embodiment, the energization time b for the motor 1 and the energization stop time c for the motor may be controlled, as in FIGS. 4 to 6.

In the camera driving stop apparatus according to this embodiment, since the stop position of the driven unit 2 is predicted from the width of the output pulse from the encoder 3, the time required to restart the motor can be shortened, and high-speed, higher-level stop control can be performed.

In this manner, the camera driving stop apparatus of the present invention may start control when the driven unit stops at a position not coinciding with the target position, or may start control when it is estimated that the stop position will not coincide with the target position. In addition, it may start the control after the driven unit is stopped near the target position, or may start control when the driven unit comes close to the target position.

(Seventh Embodiment)

A camera driving stop apparatus constituted by using a control circuit with a CPU and an IC motor drive, unlike the above-described first embodiment using individual circuit arrangements, will be described below as the seventh embodiment with reference to FIGS. 13 to 15.

More specifically, a motor 1, a driven unit 2, and a pulse generator 3 in the camera driving stop apparatus according to this embodiment shown in FIG. 13 are identical to those in FIG. 1.

In FIG. 13, a control circuit 11 using a CPU including a counter 11a, a memory 11c such as a RAM or a ROM, a determination unit 11b, and the like replaces the position detector 4, the storage unit 8, and the controller 9 in FIG. 1.

An IC motor driver 12 replaces the energization unit 5, the energization stop unit 6, the forcible energization stop unit 7, and the motor voltage setting unit 10 in FIG. 1.

The camera driving stop apparatus having the above arrangement according to the seventh embodiment shown in FIG. 13 performs the same operation as that in the first embodiment shown in FIG. 1.

More specifically, the determination unit 11b in the control circuit 11 compares the count value from the counter 11a for counting output pulses from the pulse generator 3 serving as an encoder with target position information stored in the memory 11c in advance to supply a predetermined control signal to the motor driver 12 in order to turn on/off the motor 1 in accordance with the current position of the driven unit 2.

Figure 14:
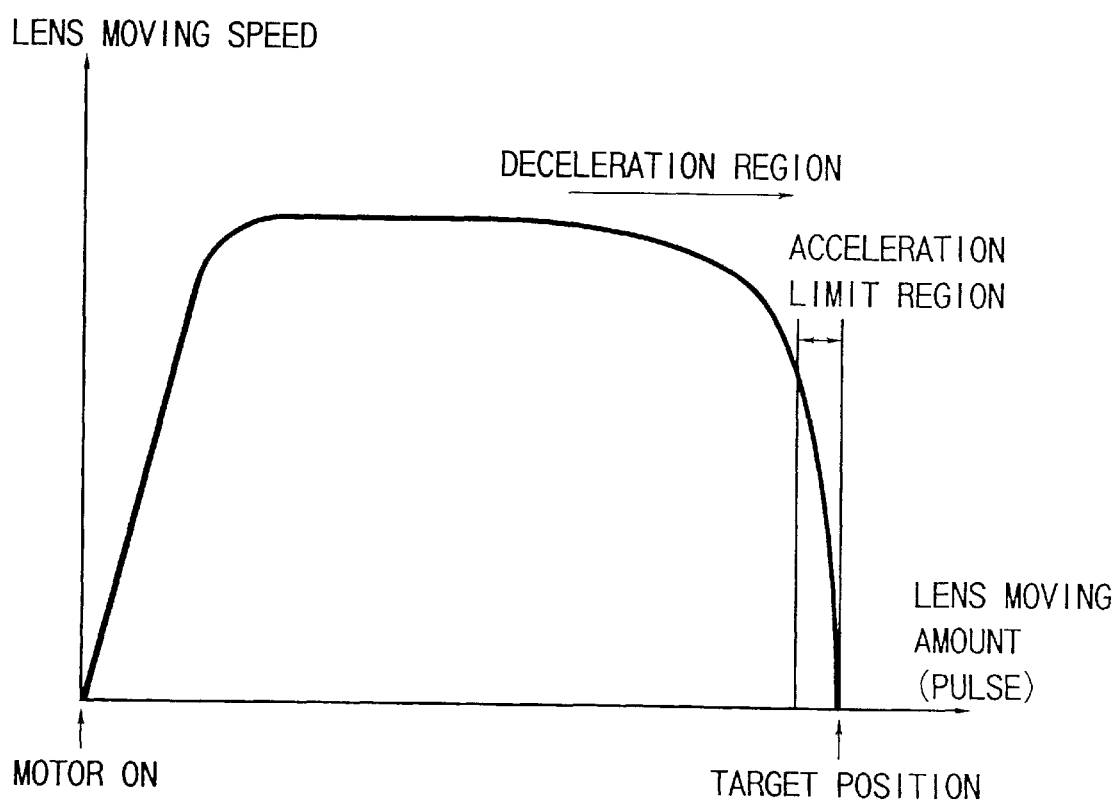
FIG. 14 is a graph showing the relationship between the lens moving speed and amount in a photographing lens focusing mechanism serving as a driven unit applied in the seventh embodiment.

FIG. 14 is a graph showing the relationship between the lens moving speed and amount in the photographing lens focusing mechanism (see FIG. 7) applied as the driven unit 2 in the seventh embodiment.

Figure 15:
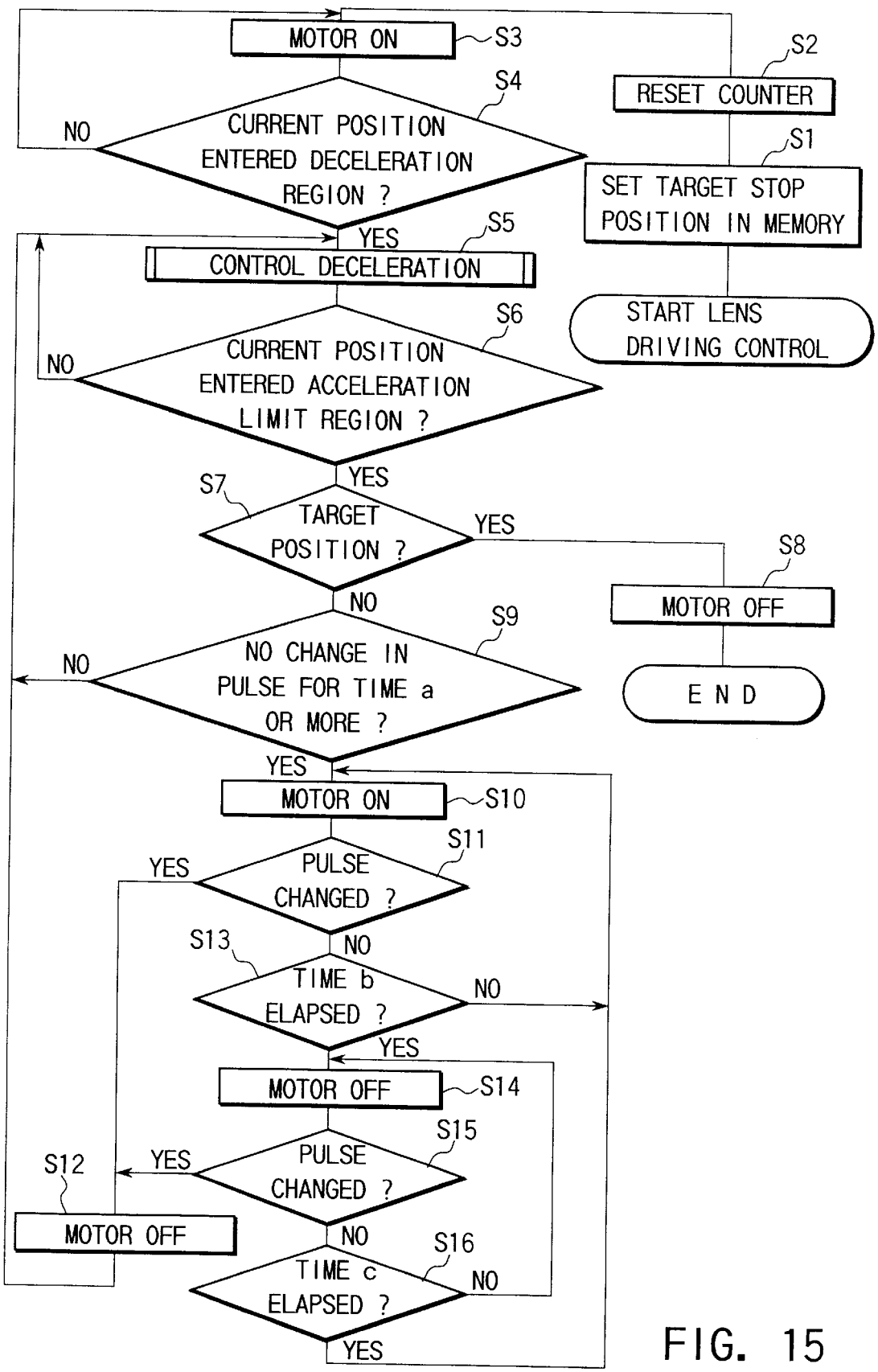
FIG. 15 is a flow chart for explaining the operation of the seventh embodiment according to the present invention.

FIG. 15 is a flow chart for explaining the actual operation of the camera driving stop apparatus according to the seventh embodiment when the driven unit 2 is the above-described photographing lens focusing mechanism.

More specifically, target stop position information is set in the memory 11c, the counter 11a is reset, and then the determination unit 11b turns on the motor 1 through the motor driver 12 (steps S1, S2, and S3).

With this operation, the driven unit 2 is driven, and it is checked whether its current position has entered a deceleration region as shown in FIG. 14 (step S4).

In step S4, the determination unit 11b checks whether the count value of output pulses from the pulse generator 3 by the counter 11a has reached a value a predetermined number of pulses before the target position stored in the memory 11c. If NO in step S4, the flow returns to step S3; if YES in step S4, it is determined that the driven unit 2 has reached the deceleration region (see FIG. 14), and the flow advances to step S5.

In step S5, known deceleration control is performed.

In step S6, the determination unit 11b then checks by the same method as that in the above-described step S4 whether the current position of the driven unit 2 has reached an acceleration limit region as shown in FIG. 14. If NO in step S6, the flow returns to step S5; if YES in step S6, it is checked in step S7 whether the current position coincides with the target position. If the determination unit 11b determines in step S7 that the current position coincides with the target position, the flow advances to step S8; if NO in step S7, the flow advances to step S9.

In step S8, the determination unit 11b turns off the motor 1 in order to forcibly stop it, and the processing ends.

In step S9, the determination unit 11b checks whether the output pulse from the pulse generator 3 has not changed for the above-described time a or more. If NO in step S9, the flow returns to step S5; if YES in step S9, the flow advances to step S10 to turn on the motor 1.

In step S11, the determination unit 11b checks whether the output pulse from the pulse generator 3 has changed. If YES in step S11, the motor 1 is turned off in step S12, and then the flow returns to step S5; if NO in step S11, the determination unit 11b checks in step S13 whether the above-described time b has elapsed.

If NO in step S13, the flow returns to step S10; if YES in step S13, the motor 1 is turned off in step S14, and then the determination unit 11b checks in step S15 whether the output pulse from the pulse generator has changed.

If YES in step S15, the motor 1 is turned off in step S12, and then the flow returns to step S5; if NO in step S15, the flow advances to step S16.

In step S16, the determination unit 11b checks whether the time c has elapsed.

If NO in step S16, the flow returns to step S14; if YES in step S16, the flow returns to step S10.

More specifically, the above processes in steps S10 to S14 are equivalent to energization control of the motor 1 by the energization unit 5 in FIG. 1, i.e., the function of energizing the motor 1 for only the second time shorter than the first time when the width of the output pulse from the pulse generator 3 is equal to or larger than the first time.

The processes in steps S14 to S16 are equivalent to energization stop of the motor 1 by the energization stop unit 6 in FIG. 1, i.e., the function of stopping energization to the motor 1 for only the third time shorter than the first time.

With the above operation, the photographing lens focusing mechanism serving as the driven unit 2 in the seventh embodiment can be stopped at an accurate in-focus position.

The control form and driven unit of the seventh embodiment are not limited to those shown in FIGS. 14 and 15. The above-described second to fifth control forms shown in FIGS. 3 to 6 and the control forms of the sixth embodiment shown in FIG. 11 can be employed alone or in combination with each other. In addition, various mechanisms serving as the driven unit applied in the above-described third to fifth embodiments shown in FIGS. 8 to 10 can be applied.

As has been described above, according to the present invention, the camera driving stop apparatus in which, since the driven means is driven without supplying any excess energy, the stop position upon completion of control does not overrun the target position, and high-precision stop control can be realized, and, even if the load increases, the driven means can be accurately driven to enable precise, reliable stop control can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. A camera stop driving apparatus comprising:
    a motor serving as a driving source upon reception of a current;
    a driven unit for performing a predetermined operation associated with driving of a camera by using said motor as said driving source;
    a pulse generator for outputting a pulse in response to an operation of at least one of said motor and said driven unit;
    a position detector for detecting a current position of said driven unit by counting pulses output from said pulse generator;
    an energization unit for energizing said motor for only a second time shorter than a first time;
    an energization stop unit for stopping energization of said motor for only a third time shorter than the first time;
    a forcible energization stop unit for inhibiting energization of said motor;
    a storage unit for holding a target position of said driven unit; and
    a controller for: (i) comparing the target position of said driven unit held in said storage unit with the current position detected by said position detector when a width of the pulse output from said pulse generator is not less than the first time, (ii) alternately operating said energization unit and said energization stop unit when the target position and current position do not coincide with each other, and (iii) operating said forcible energization stop unit when the target position and current position coincide with each other.

2. An apparatus according to claim 1, wherein said controller: (i) compares the target position of said driven unit held in said storage unit with the current position detected by said position detector when the target position and current position do not coincide with each other, (ii) alternately operates said energization unit and said energization stop unit while increasing the first time each time said energization unit is operated, and (iii) when the target position and current position coincide with each other, operates said forcible energization stop unit.

3. An apparatus according to claim 1, wherein said controller: (i) compares the target position of said driven unit held in said storage unit with the current position detected by said position detector when the target position and current position do not coincide with each other, (ii) alternately operates said energization unit and said energization stop unit while decreasing the second time each time said energization unit is operated, and (iii) when the target position and current position coincide with each other, operates said forcible energization stop unit.

4. An apparatus according to claim 1, wherein said controller: (i) compares the target position of said driven unit held in said storage unit with the current position detected by said position detector when the target position and current position do not coincide with each other, (ii) alternately operates said energization unit and said energization stop unit while increasing a number of times said energization unit is operated each time said energization unit is operated, and (iii) when the target position and current position coincide with each other, operates said forcible energization stop unit.

5. An apparatus according to claim 1, further comprising a motor voltage setting unit for changing a driving voltage of said motor.

6. An apparatus according to claim 5, wherein said controller: (i) compares the target position of said driven unit held in said storage unit with the current position detected by said position detector when the target position and current position do not coincide with each other, (ii) alternately operates said energization unit and said energization stop unit by controlling said motor voltage setting means so as to increase the driving voltage of said motor each time said energization unit is operated, and (iii) when the target position and current position coincide with each other, operates said forcible energization stop unit.

7. An apparatus according to claim 1, wherein said driven unit includes a zooming mechanism for a photographing lens of said camera.

8. An apparatus according to claim 1, wherein said driven unit includes a focusing mechanism for a photographing lens of said camera.

9. An apparatus according to claim 1, wherein said driven unit includes a film feed mechanism of said camera.

10. An apparatus according to claim 1, wherein said driven unit includes a driving force transmission path switching mechanism of said camera.

11. An apparatus according to claim 1, wherein said controller: (i) compares the target position of said driven unit held in said storage unit with the current position detected by said position detector when the target position and current position come close to each other, (ii) alternately operates said energization unit and said energization stop unit, and (iii) when the target position and current position coincide with each other, operates said forcible energization stop unit.

12. An apparatus according to claim 1, wherein said controller: (i) compares the target position of said driven unit held in said storage unit with the current position detected by said position detector after an edge pulse one before the target position is detected as the current position, (ii) alternately performs an energization operation and an energization stop operation at predetermined time intervals, and (iii) when the target position and current position coincide with each other, operates said forcible energization stop unit.

13. An apparatus according to claim 1, wherein said controller comprises a speed detector for calculating the width of the output pulse from said pulse generator, and for detecting a moving speed of said driven unit when a speed, detected by said speed detector a predetermined number of pulses before the target position from the current position, is lower than a predetermined speed, and wherein said controller alternately operates said energization unit and said energization stop unit at predetermined time intervals, and, when the target position and current position coincide with each other, operates said forcible energization stop unit.

14. An apparatus according to claim 1, wherein said controller controls said driven unit to temporarily stop near the target position.

15. A camera driving stop apparatus comprising:
   a motor serving as a driving source upon reception of a current;
   a driven unit for performing a predetermined operation associated with an operation of a camera by using said motor as said driving source;
   a pulse generator for outputting a pulse in response to an operation of at least one of said motor and said driven unit;
   a position detector for detecting a current position of said driven unit by counting pulses output from said pulse generator;
   a storage unit for holding a target position of said driven unit; and
   a controller for: (i) comparing the target position of said driven unit held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

16. An apparatus according to claim 15, wherein said controller: (i) compares the target position of said driven unit held in said storage unit with the current position detected by said position detector when the target position and current position do not coincide with each other, (ii) alternately energizes and stops energization of said motor while increasing the first time each time said motor is energized, and (iii) when the target position and current position coincide with each other, inhibits energization of said motor.

17. An apparatus according to claim 15, wherein said controller: (i) compares the target position of said driven unit held in said storage unit with the current position detected by said position detector when the target position and current position do not coincide with each other, (ii) alternately energizes and stops energization of said motor while decreasing the second time each time energization of said motor is stopped, and (iii) when the target position and current position coincide with each other, inhibits energization of said motor.

18. An apparatus according to claim 15, wherein said controller: (i) compares the target position of said driven unit held in said storage unit with the current position detected by said position detector when the target position and current position do not coincide with each other, (ii) alternately energizes and stops energization of said motor while increasing a number of energization operations to be performed each time said motor is energized, and (iii) when the target position and current position coincide with each other, inhibits energization of said motor.

19. An apparatus according to claim 15, further comprising a motor voltage setting unit for changing a driving voltage of said motor.

20. An apparatus according to claim 15, wherein said controller: (i) compares the target position of said driven unit held in said storage unit with the current position detected by said position detector when the target position and current position do not coincide with each other, (ii) alternately energizes and stops energization of said motor by increasing the driving voltage of said motor each time said motor is energized, and (iii) when the target position and current position coincide with each other, inhibits energization of said motor.

21. An apparatus according to claim 15, wherein said driven unit includes a zooming mechanism for a photographing lens of said camera.

22. An apparatus according to claim 15, wherein said driven unit includes a focusing mechanism for a photographing lens of said camera.

23. An apparatus according to claim 15, wherein said driven unit includes a film feed mechanism of said camera.

24. An apparatus according to claim 15, wherein said driven unit includes a driving force transmission path switching mechanism of said camera.

25. An apparatus according to claim 15, wherein said controller: (i) compares the target position of said driven unit held in said storage unit with the current position detected by said position detector when the target position and current position come close to each other, (ii) alternately energizes and stops energization of said motor, and (iii) when the target position and current position coincide with each other, inhibits energization of said motor.

26. An apparatus according to claim 15, wherein said controller: (i) compares the target position of said driven unit held in said storage unit with the current position detected by said position detector after an edge pulse one before the target position is detected as the current position, (ii) alternately energizes and stops energization of said motor at predetermined time intervals, and (iii) when the target position and current position coincide with each other, inhibits energization of said motor.

27. An apparatus according to claim 15, wherein said controller comprises a speed detector for calculating the width of the output pulse from said pulse generator, and for detecting a moving speed of said driven unit when a speed, detected by said speed detector a predetermined number of pulses before the target position from the current position, is lower than a predetermined speed, and wherein said controller alternately energizes and stops energization of said motor at predetermined time intervals, and, when the target position and current position coincide with each other, inhibits energization of said motor.

28. An apparatus according to claim 15, wherein said controller controls said driven unit to temporarily stop near the target position.

29. A camera driving stop apparatus comprising:
   a motor serving as a driving source upon reception of a current;
   a photographing lens zooming mechanism for performing a zooming operation for a photographing lens of a camera by using said motor as said driving source;
   a pulse generator for outputting a pulse in response to an operation of at least one of said photographing lens zooming mechanism and said motor;
   a position detector for detecting a current position of said photographing lens zooming mechanism by counting pulses output from said pulse generator;
   a storage unit for holding a target position of said photographing lens zooming mechanism; and
   a controller for: (i) comparing the target position of said photographing lens zooming mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

30. A camera driving stop apparatus comprising:
   a motor serving as a driving source upon reception of a current;
   a photographing lens focusing mechanism for performing a focusing operation for a photographing lens of a camera by using said motor as said driving source;
   a pulse generator for outputting a pulse in response to an operation of at least one of said photographing lens focusing mechanism and said motor;
   a position detector for detecting a current position of said photographing lens focusing mechanism by counting pulses output from said pulse generator;
   a storage unit for holding a target position of said photographing lens focusing mechanism; and
   a controller for: (i) comparing the target position of said photographing lens focusing mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

31. A camera driving stop apparatus comprising:
   a motor serving as a driving source upon reception of a current;
   a film feed mechanism for performing a film feed operation for a camera by using said motor as said driving source;
   a pulse generator for outputting a pulse in response to an operation of at least one of said film feed mechanism and said motor;
   a position detector for detecting a current position of said film feed mechanism by counting pulses output from said pulse generator;
   a storage unit for holding a target position of said film feed mechanism; and
   a controller for: (i) comparing the target position of said film feed mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

32. A camera driving stop apparatus comprising:
   a motor serving as a driving source upon reception of a current;
   a driving force transmission path switching mechanism for switching a driving force transmission path of a camera by using said motor as said driving source;
   a pulse generator for outputting a pulse in response to an operation of at least one of said driving force transmission path switching mechanism and said motor;
   a position detector for detecting a current position of said driving force transmission path switching mechanism by counting pulses output from said pulse generator;
   a storage unit for holding a target position of said driving force transmission path switching mechanism; and
   a controller for: (i) comparing the target position of said driving force transmission path switching mechanism held in said storage unit with the current position detected by said position detector when a width of the pulse output from said pulse generator is not less than a first time, (ii) alternately energizing said motor for only a second time shorter than the first time and stopping energization of said motor for only a third time shorter than the first time when the target position and current position do not coincide with each other, and (iii) inhibiting energization of said motor when the target position and current position coincide with each other.

* * * * *